Patented Apr. 3, 1923.

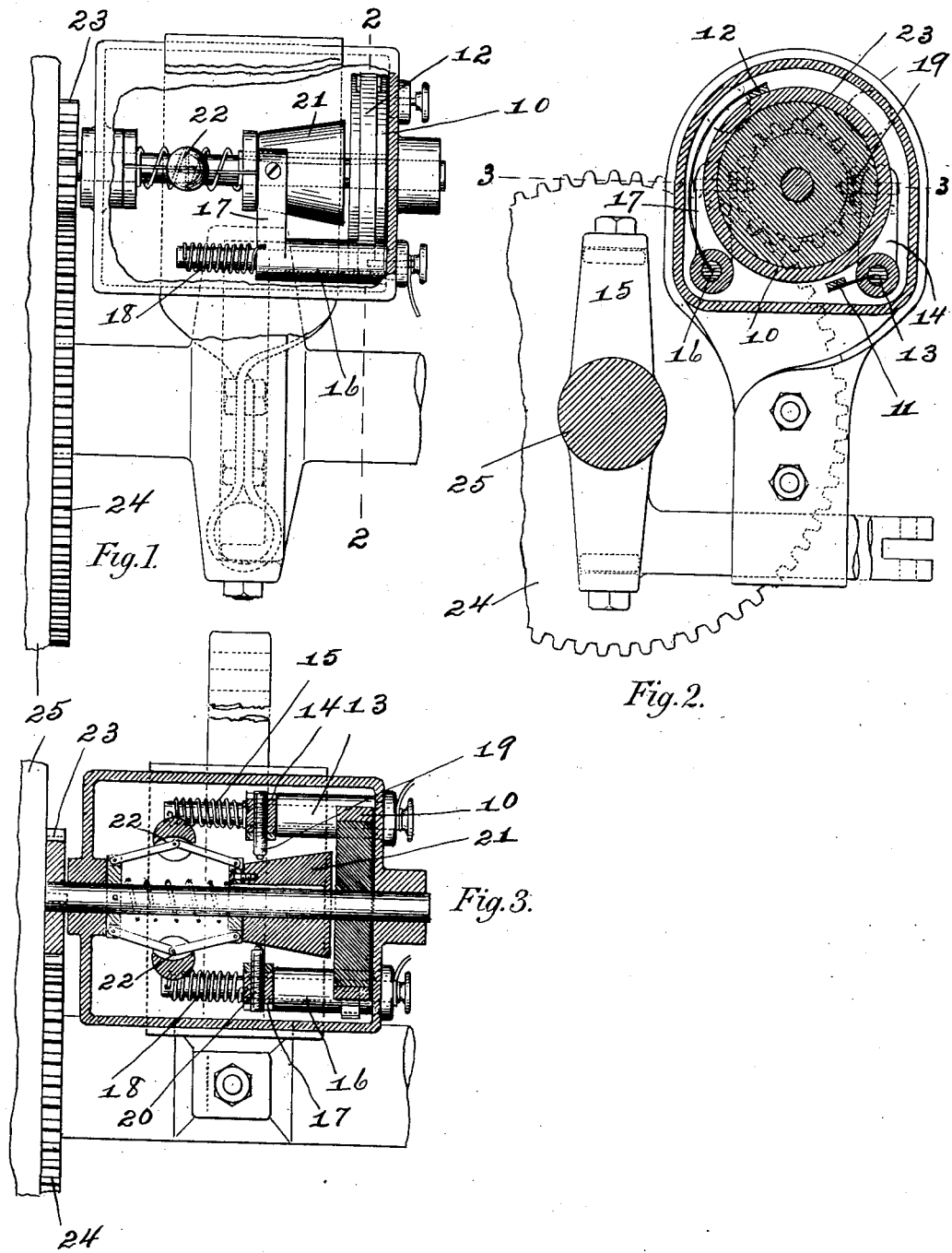

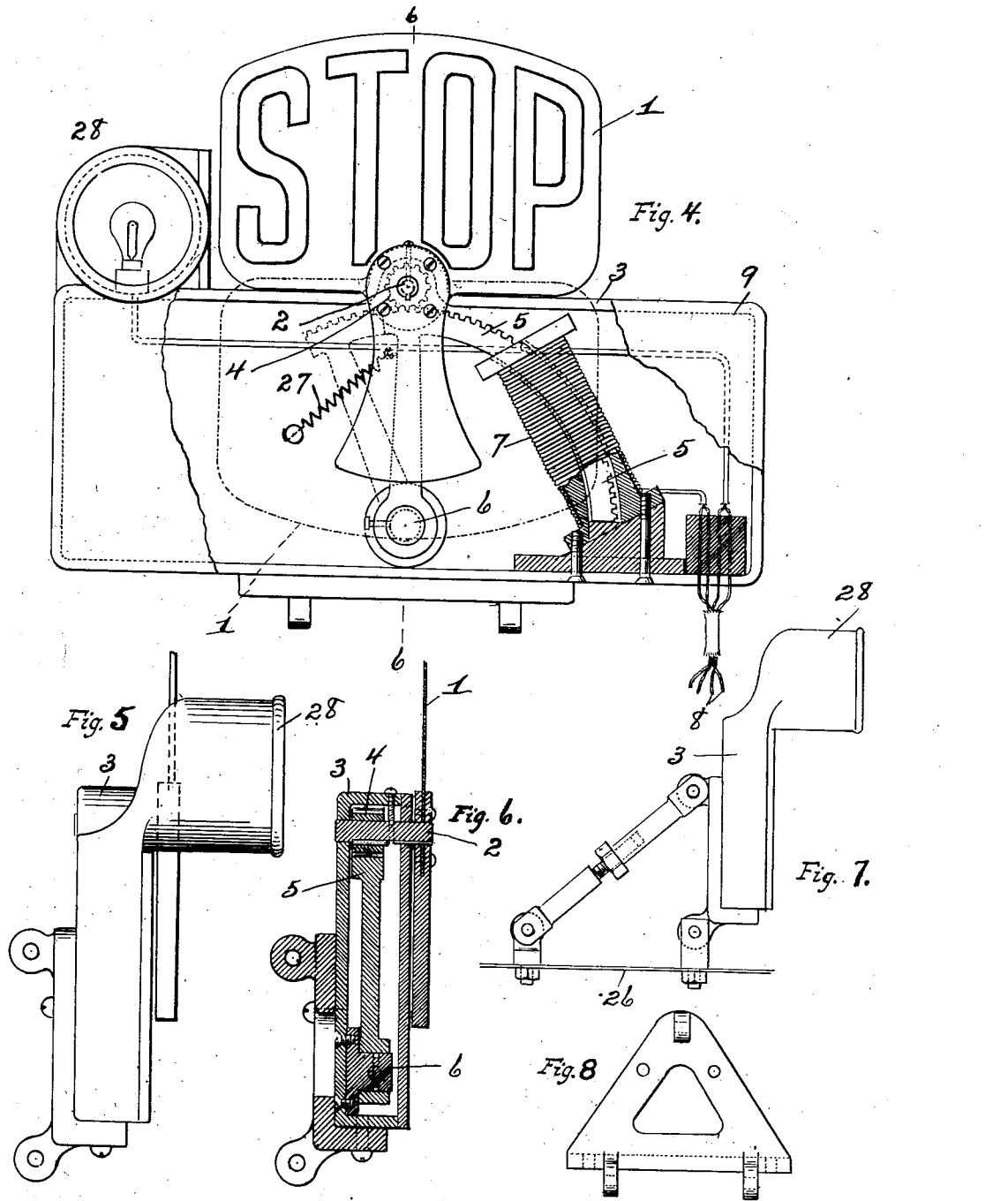

1,450,337

UNITED STATES PATENT OFFICE.

MYRON D. SHIVERICK, OF ALBANY, NEW YORK, ASSIGNOR TO SWEET & DOYLE FOUNDRY AND MACHINE CO., OF GREEN ISLAND, NEW YORK, A CORPORATION OF NEW YORK.

AUTOMOBILE SIGNAL.

Application filed March 14, 1921. Serial No. 451,958.

*To all whom it may concern:*

Be it known that I, MYRON D. SHIVERICK, a citizen of the United States, residing at Albany, in the county of Albany and State of New York, have invented new and useful Improvements in Automobile Signals, of which the following is a specification.

Reference may be had to the accompanying drawings, and the reference characters marked thereon, which form a part of this specification. Similar characters refer to similar parts in the several figures therein.

The principal object of the invention is to display a warning signal upon a vehicle when the vehicle is traveling at such speed as to create danger of collision of a following vehicle therewith.

Other objects will appear in connection with the following description.

When a road vehicle such as an automobile is traveling very slowly, or when it is traveling very fast, there is practically no danger of collision of a following vehicle therewith; but when an automobile is traveling at a reasonable speed not faster than the usual speed limit in city traffic where it is subject to sudden reductions in speed, there is danger of collision of a following vehicle therewith. For example,—when an automobile is traveling at a speed of only three or four miles an hour there is very little danger from a following vehicle, also when the automobile is traveling at fifteen or twenty miles or more an hour there is little danger from a following vehicle; but between these limits especially in city traffic the automobile is likely to be quickly slowed down on account of traffic conditions, and such sudden changes of speed are frequently the cause of rear-end collisions.

In carrying out my invention, I employ a warning signal at the rear of the vehicle with means for automatically displaying said signal only when the speed of the vehicle exceeds a predetermined minimum and does not exceed a predetermined maximum.

The predetermined minimum and maximum speeds may be varied in accordance with the traffic conditions of the place where the vehicle is used.

Fig. 1 of the drawings is a view in rear elevation of a broken-away portion of an axle and wheel of an automobile showing the centrifugal governor mechanism of my improved signal mounted upon the axle, the casing of the centrifugal mechanism being broken away.

Fig. 2 is a vertical cross-section of the same taken on the broken line 2—2 in Fig. 1.

Fig. 3 is a horizontal section of the same taken on the broken line 3—3 in Fig. 2.

Fig. 4 is a view in rear elevation of the movable signal member, and the housing for the mechanism which directly operates the same.

Fig. 5 is a view in side elevation of the same.

Fig. 6 is a vertical section of the same taken longitudinally of the vehicle on the broken line 6—6 in Fig. 4.

Fig. 7 is a view in side elevation showing the housing which appears in Fig. 5, mounted upon a fender or mud-guard of a vehicle.

Fig. 8 is a view in front elevation of a bracket by which the housing is so mounted upon the mud-guard.

Referring to the drawings wherein the invention is shown in preferred form, 1 is a visible signal fixed upon a shaft, 2, rotatively mounted in a case or housing, 3, and having fixed thereon a pinion, 4, within the housing. The housing, 3, is mounted at some convenient place at the rear of the vehicle.

The pinion, 4, is engaged by a toothed segmental rack, 5, rotatively mounted upon a stud, 6, within the housing, 3.

The toothed-rack, 5, is extended to form the core of a solenoid, 7, also mounted within the housing, 3, and adapted to be energized by an electric circuit formed in part by the wires, 8.

The signal member, 1, which is shown bearing the notice "Stop," except when displayed as a warning, is swung down out of sight back of the license or number-plate, 9, a coil-spring, 27, connected with the rack, 5, tending to yieldingly support the signal member, 1, in such hidden position except when the solenoid, 7, is energized.

The construction is such that when the solenoid, 7, is energized, the rack, 5, acts as a core for the solenoid and is drawn therewithin causing the pinion, 4, to be rotated and the signal member, 1, to be swung up to display-position as shown in Fig. 4, in which position the warning is visible to the driver of a following vehicle.

The solenoid, 7, with its wires, 8, is in circuit with a suitable source of electrical energy and also in circuit with a contact-ring, 10, at certain times through two circuit-making-and-breaking members, 11 and 12.

The member, 11 is carried by a rock-shaft, 13, actuated in one direction by a rocker-arm, 14, and in the opposite direction by a coil-spring, 15, which encircles the inner end of said shaft.

The member, 12, is carried by a rock-shaft, 16, actuated in one direction by a rocker-arm, 17, and in the opposite direction by a coil-spring, 18, which encircles the inner end of said shaft.

The rocker-arm, 14, carries a follower-screw, 19, and the rocker-arm, 17, carries a similar follower-screw, 20.

These follower-screws, 19 and 20, extend into the path of a movable conical member, 21, forming part of a centrifugal governor, 22, which is driven by means of a pinion, 23, engaged by a gear, 24, on the hub of a wheel 25, of the vehicle, whereby the governor is operated in accord with the driving mechanism of the vehicle.

The spring, 15, tends to yieldingly hold the circuit-making-and-breaking member, 11, out of contact with the contact-ring, 10; and engagement of the conical member, 21, with the follower-screw, 19, causes said member, 11, to be forced into contact with the contact-ring, 10, against the force of said spring.

The spring, 18, tends to yieldingly hold the circuit-making-and-breaking member, 12, in contact with the contact-ring, 10, except when said member is forced out of contact by engagement of the conical member, 21, with the follower-screw, 20.

The operation of the device is as follows:—

When the vehicle is at rest or moves very slowly, the conical member, 21, is withdrawn from both follower-screws, 19 and 20, in which position the circuit-making-and-breaking member, 12, is held by its spring, 18, in contact with the contact-ring, 10, while the circuit-making-and-breaking member, 11, is held by its spring, 15, out of contact with said ring, the parts being in the position shown in Fig. 2, with the circuit broken by the member, 11, and the signal member, 1, hidden back of the license-plate, 9, or other screen provided for the purpose.

In this position the follower-screw, 19, controlling the member, 11, is in closer proximity to the conical member, 21, than is the follower-screw, 20, controlling the member, 12.

The screw, 19, is so adjusted that when the speed of the vehicle reaches the predetermined minimum, said screw will be engaged by the conical member, 21, to rock the shaft, 13, and force the member, 11, into contact with the contact-ring, 10, the member, 12, being already in contact with the contact-ring, 10. The circuit will thus be closed causing the solenoid, 7, to be energized and the warning signal to be displayed as above explained.

When the speed of the vehicle reaches the predetermined maximum, the conical member, 21, by engagement with the follower-screw, 20, causes the shaft, 16, to be rotatively moved in a direction to move the member, 12, out of contact with the contact-ring, 10, thereby breaking the circuit and permitting the signal-member, 1, to be returned to concealed position by the action of the spring, 27.

The follower-screws, 19 and 20, may be adjusted in accordance with any predetermined minimum and maximum speeds. Thus for ordinary city traffic the follower-screw, 19, might be adjusted to cause the warning signal to be displayed as soon as the machine reaches a speed of four miles an hour, and the screw, 20, might be adjusted to break the circuit when the speed reaches a maximum of fifteen miles an hour. The warning signal would thus be displayed at any time when the speed of the machine was between four and fifteen miles an hour, but when the speed was in excess of fifteen miles an hour, the signal would be concealed, and it would also be concealed when the machine was not running or when its speed was less than four miles an hour.

I have shown a preferred form of electrical mechanism for actuating the signal in accordance with my invention, but I do not wish to be limited to the means shown and specifically described, as for certain purposes of the invention any known mechanism may be employed for operating the signal member in substantially the manner above described to accomplish the stated result; nor do I wish to be limited to a movable signal member, as, for certain purposes of the invention, any known form of warning signal may be employed which permits of display at certain predetermined times only.

The conical member, 21, acts in the manner of a cam, and the screws, 19 and 20, in the manner of cam-followers. Making the member, 21, of conical form accomplishes the result in a simple manner, but substantially the same result could be accomplished by cams and cam-followers of different forms.

I have not shown the source of electrical energy, as the same may be an ordinary storage battery, dry battery or the like.

I have shown at 28, the ordinary tail-light of the vehicle which forms no part of the present invention.

I have shown the housing, 3, mounted upon a rear fender or mud-guard, 26, of the vehicle as seen in Fig. 7.

What I claim as new and desire to secure by Letters Patent is:—

1. The combination with a vehicle, of an electric signal included in an electric circuit with two circuit-making-and-breaking members, a centrifugal governor operated in accord with the driving mechanism of the vehicle, means associated with each of said members to close the circuit when the speed of the vehicle is decreased below or increased above a predetermined limit.

2. The combination with a vehicle, of an electric signal included in an electric circuit with two circuit-making-and-breaking members, a centrifugal governor operated in accord with the driving mechanism of the vehicle, means for actuating each of said members in opposite directions, means associated with each of said members to close the circuit when the speed of the vehicle is decreased or increased above a predetermined limit.

3. The combination with a vehicle, of an electric signal included in an electric circuit having two circuit - making - and - breaking members, a centrifugal governor, a coned sleeve associated with said governor, means on each of said members adapted to be operatively connected with said coned sleeve at different speeds of the vehicle for actuating said signal.

4. The combination with a vehicle, of an electric signal included in an electric circuit having two circuit-making - and - breaking members, a centrifugal governor, a coned sleeve associated with said governor, adjustable means on each of said members adapted to be operatively connected with said coned sleeve at different speeds of the vehicle for actuating said signal.

5. The combination with a vehicle, of an electric signal included in an electric circuit having two -circuit - making - and - breaking members, a centrifugal governor, a conical sleeve associated with said governor, a rock arm for actuating each of said members in one direction, and a spring for moving the said members in the opposite direction, and means extending radially from said arms adapted to contact with said conical sleeve whereby said members are operated at different speeds of the vehicle to close the circuit except when the speed of the vehicle is decreased below or increased above the predetermined limit.

6. The combination with a vehicle; of an electric signal included in an electric circuit having two circuit-making-and-breaking members; a centrifugal governor operated in accord with the driving mechanism of the vehicle; said governor having a movable conical member; circuit-making-and-breaking members, one yieldingly held in circuit-making position, and the other yieldingly held in circuit-breaking position; and means in the path of said conical member for causing said first-mentioned circuit - making - and - breaking member to break the connection at a predetermined maximum of speed, and for causing said second-mentioned circuit-making-and-breaking member to make connection at a predetermined minimum speed, of the vehicle.

In testimony whereof, I have hereunto set my hand this 11th day of March, 1921.

MYRON D. SHIVERICK.